United States Patent [19]

Piget

[11] 4,180,347

[45] Dec. 25, 1979

[54] FOUR BRANCH SPRING STEEL JAM FASTENER CLIP FOR ASSEMBLY OF OPEN EXTRUSIONS

[76] Inventor: Maurice Piget, Boisset les Prevanches, 27120 Pacy sur Eure, France

[21] Appl. No.: 942,731

[22] Filed: Sep. 15, 1978

[51] Int. Cl.$^2$ .......................... B25G 3/00; F16B 5/06
[52] U.S. Cl. .................................. 403/405; 403/377; 52/732
[58] Field of Search ...................... 403/405, 105, 377; 52/632, 732

[56] References Cited

U.S. PATENT DOCUMENTS

| | | | |
|---|---|---|---|
| 3,355,204 | 11/1967 | Philpot | 52/732 X |
| 3,516,698 | 6/1970 | Didry | 403/377 X |
| 3,588,151 | 6/1971 | Korenz | 403/405 |
| 3,830,034 | 8/1974 | Kupersmit | 403/405 X |

*Primary Examiner*—Wayne L. Shedd

*Attorney, Agent, or Firm*—Sughrue, Rothwell, Mion, Zinn and Macpeak

[57] ABSTRACT

A clip of round spring steel wire or rod stock for jam or wedge fastening two extruded members together, one of which has a square cornered U-shaped cross-section with an inturned edge on one of its arms, comprises four distinct, straight, continuous branches. Three of the branches 1, 2, 3 lie in a common "bending" plane, and the third and fourth branches 3, 4 define a dihedral plane which forms an acute, perpendicular or obtuse angle with the bending plane—depending upon the desired direction of relative longitudinal movement between the two extrusion members. The unstressed angle between the third and fourth branches is initially 45°, which is bent to less than 45° during the installation insertion of the clip in the U-shaped member, wherein the bending plane forms an internal diagonal across the member from the corner of the inturned arm. The length of the fourth arm slightly exceeds the internal width of the U-shaped member, whereby the other member is unidirectionally jam fastened during its assembly.

6 Claims, 21 Drawing Figures

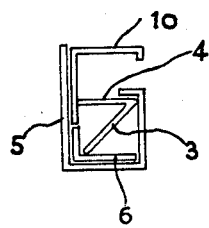
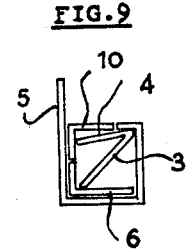
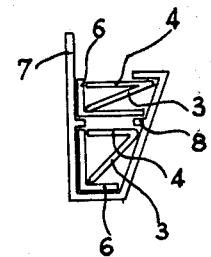
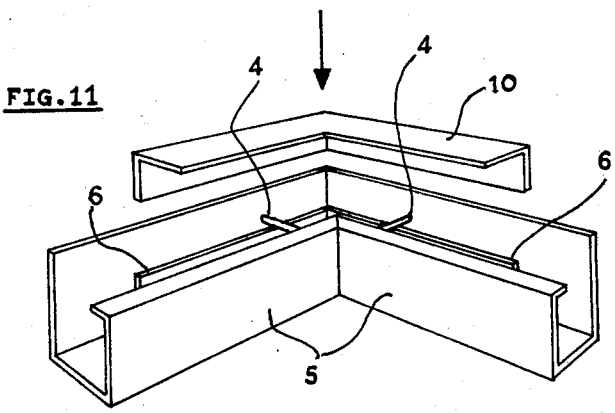
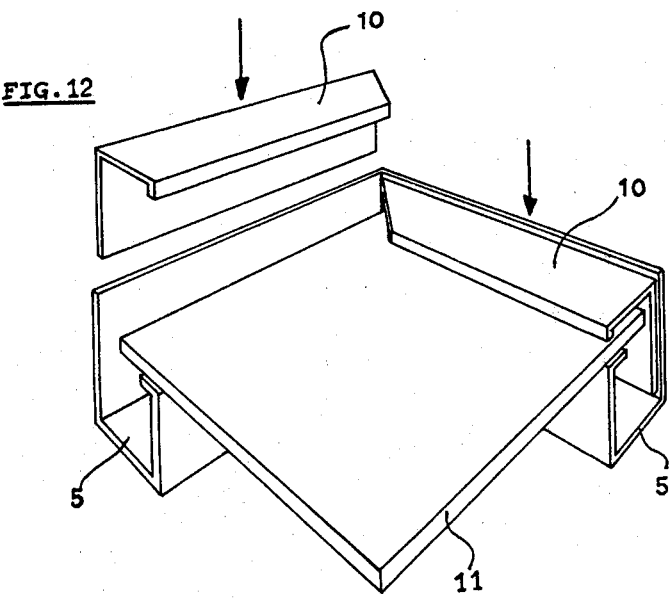

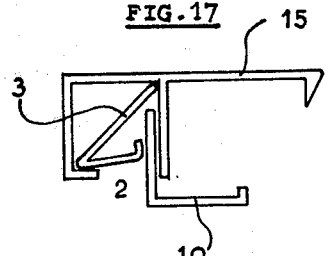
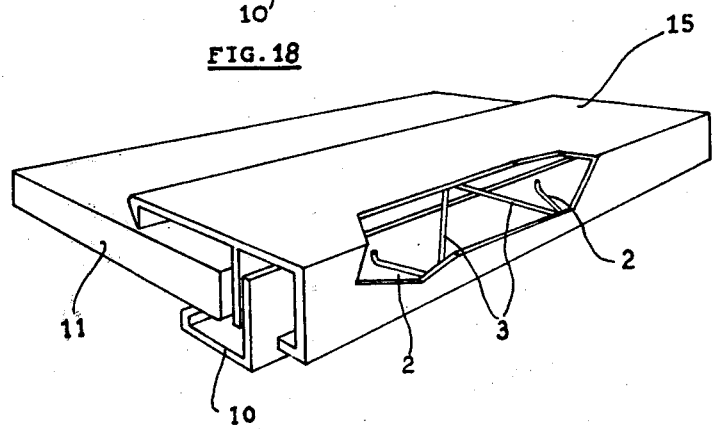
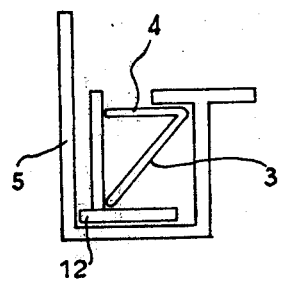
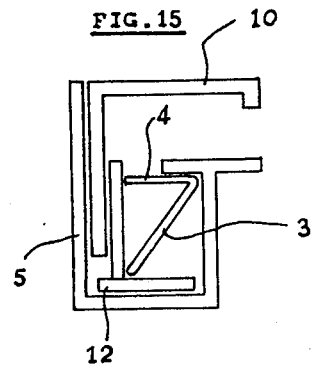
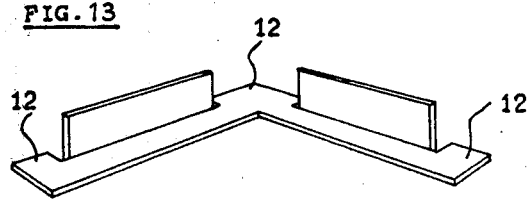

FOUR BRANCH SPRING STEEL JAM FASTENER CLIP FOR ASSEMBLY OF OPEN EXTRUSIONS

BACKGROUND OF THE INVENTION

This invention relates to a spring steel jam or wedge fastener clip for the assembly of two or more extruded members, such as picture, door or window frame components, at least one of which members has a square cornered U-shaped cross-section with an inturned edge on one of its arms.

The orthogonal assembly of two open extrusions with a square and spring blades to avoid movement, has, because of the reduction in assembly costs, been put to many applications, particularly where it is necessary for the assembly to be easily taken down.

As described in French Pat. Nos. 1,345,121 and 1,548,629, in British Pat Nos. 1,052,058 and 1,235,719 and in U.S. Pat. No. 3,216,539, the support of one of the two perpendicular branches on one of the two extrusions is determined by a three-sided spring blade, the internal width of the extrusion being equal to the sum of the width of the spring blade and the thickness of the inner surface of the square.

For a spring sheet steel clip a round or square spring steel clip can be substituted, such as those described in French Pat. No. 1,548,630, British Pat. No. 1,244,025 and U.S. Pat. No. 3,516,698, such a clip comprising one middle branch and two oblique end branches of unequal lengths and variable span. This clip allows tolerances in extrusion sizes to be absorbed. The middle branch of this clip is supported by the dihedral of a square L-sectioned extrusion and the ends of the two oblique branches are supported by the inturned dihedral of a U-shaped extrusion, the efficiency of this clip resulting from the spring anchoring of the ends of the oblique branches under the effect of a bending load. These three-sided bendable clips, however, are prone to longitudinal sliding.

SUMMARY OF THE INVENTION

It has now been found that by using a four branched clip structure it is possible to make the torsion contribute to the clip's holding, and at the same time greater installation ease can be obtained, particularly the manual manipulation and insertion of the clip during assembly.

The clip of the present invention, in round spring steel, is principally characterized by its four-sided structure, of which three branches lie in a bending plane, the third and fourth branches defining a plane which forms a dihedral with the bending plane which can lie at an acute, perpendicular or obtuse angle according to the relative longitudinal sliding direction which the clip must resist. The fourth branch forms a 45° angle with the third branch when it is not under pressure, this angle being reduced to a value lower than 45° by the application of bending pressure during assembly. The sharp stamping of the end of the fourth branch prevents any transverse sliding. In this way the clip of the present invention provides anchoring comparable to that of soldering or welding, experiments showing for example that a clip formed of 80 kg spring steel wire of an 8/10 diameter, i.e., having a section of 0.5 mm$^2$, with the fourth branch being 8 mm in length, can bear a load of 20 kgs.

The drawings show various applications to which the clip of the present invention can be put, these applications establishing the role of each of the branches of said clip to execute assembly with a simple extrusions member such as a square U-shape in which one of the two arms has an inturned edge or return fold. The other extrusion member may be a metal trim without a return fold, a wing of an angle iron, a T square, or a finished guard member. The assembly is not susceptible to transversal sliding and to longitudinal sliding in at least one direction. Longitudinal sliding in the other direction may be retained for ease in disassembly.

BRIEF DESCRIPTION OF THE DRAWINGS

In the drawings:

FIGS. 7 and 8 are sectional views showing the orthogonal assembly of two two-stage, extrusions, FIGS. 9 and 10 are sectional views of an angle assembly of two U extrustions, using a square and a closing element to define a framework, FIG. 11 is a perspective view of the angle assembly according to FIGS. 9 and 10, FIGS. 12, 13, 14 and 15 show examples of the application of the clip in forming a framework, the right angle comprising a heel member, FIGS. 17 and 18 show the use of the clip in forming a framework by fitting the unit from the back of the framework.

DETAILED DESCRIPTION OF THE PREFERRED EMBODIMENTS

Figure 1:
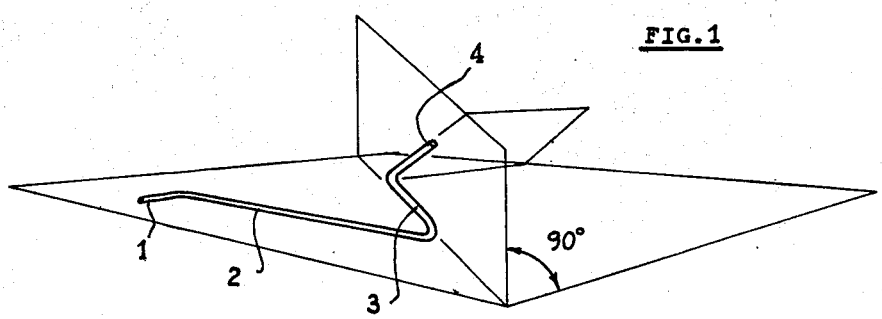
FIG. 1 is a perspective view of the clip of the present invention.

In the various drawings the clip of the present invention comprises four branches, branches 1, 2 and 3 lying in a bending plane and branches 3 and 4 defining a plane which forms an acute, perpendicular or obtuse dihedral with the bending plane—this dihedral being perpendicular in FIG. 1.

Figure 2:
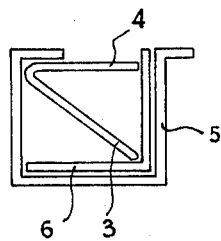
FIG. 2 is a sectional view of one of the extrusions for the orthogonal assembly of two U extrusions.

In FIG. 2, inside the U section extrusion 5 which is to be assembled with an element of the same structure, one of the branches of a right angle piece 6 is inserted. The support of the clip in the element is ensured by the branch 3 being placed diagonally between the dihedral of the right angle piece 6 and the dihedral formed by the return fold of the U section. During the insertion of the clip the branches 2 and 3 are sprung apart to open the angle between them, and after release the spring pressure tends to close this angle to thereby wedge and hold the clip in its installed diagonal position.

Figure 6:
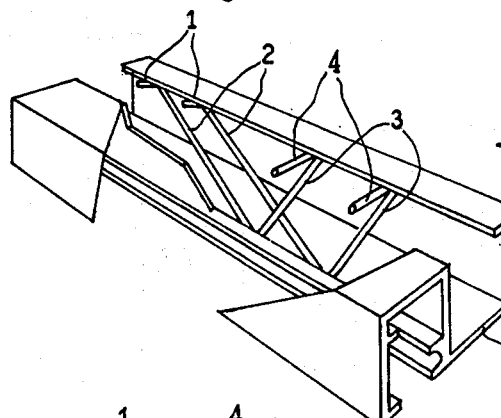
FIG. 6 is a perspective view with a cutaway portion showing the installation of two clips inside the same extrusion in the same direction.
Figure 3:
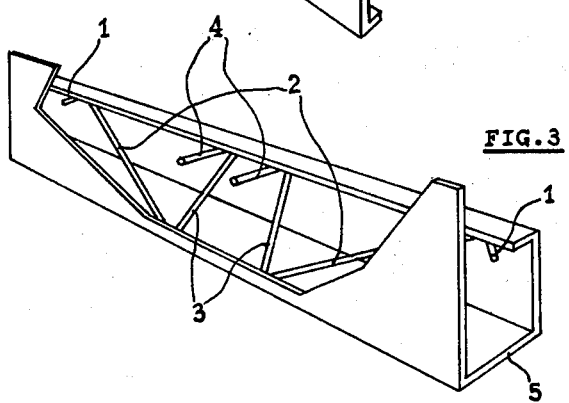
FIG. 3 is a perspective view with a cutaway portion showing the inverted placing of two clips inside the same U extrusion.

By placing, as shown in FIG. 3, two clips in inverted position, any longitudinal sliding in either direction of a further member inserted, such as the right angle piece 6, is prevented by the ends of the fourth branches 4 being bent during the insertion of the further member and jamming or wedging thereagainst. On the other hand, the positioning of two clips in the same direction, as shown in FIG. 6, only prevents longitudinal sliding in one direction, thereby enabling easy disassembly.

Figure 4:
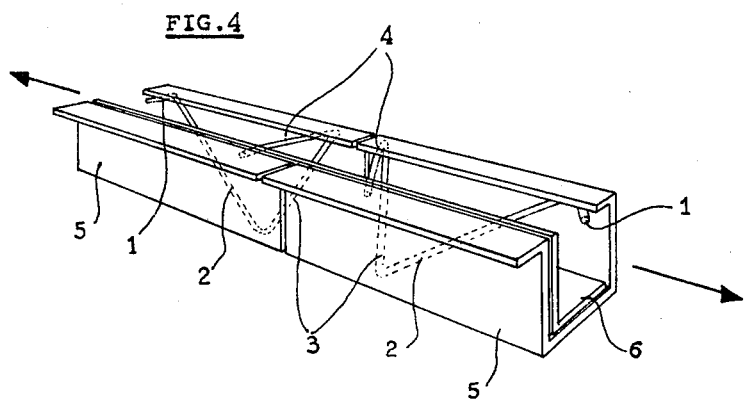
FIGS. 4 and 5 are perspective views of the end to end assembly of two U extrusions.
Figure 5:
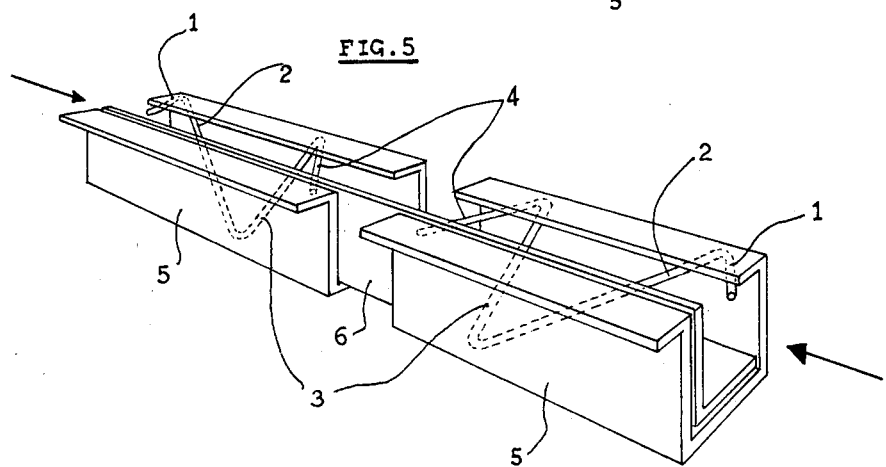

The two elements placed end to end in FIG. 4 and joined by a common right angle piece 6 cannot be separated due to the placing of two clips in inverted positions, one of the clips prohibiting longitudinal sliding in one direction, the other in the other direction. In this example the dihedral angle between the bending plane and the plane defined by branches 3 and 4 is acute. In FIG. 5, where it is desired to maintain the two elements 5 assembled end to end by the same right angle piece 6 separated, the two clips being in inverted positions.

Figure 8:
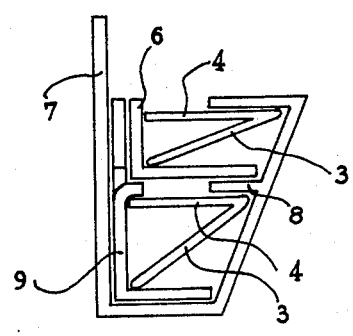

In FIGS. 7 and 8 a two step profile 7 is used which comprises intermediate edges 8 on which the upper angle piece 6 sits, a similar angle piece being placed in an inverse position in the lower part (FIG. 7), and each of the two angle pieces being fixed by the clip of the invention. The lower angle piece 9 (FIG. 8) may embody one of the edges 8.

In FIGS. 9, 10 and 11, the elements are orthogonally assembled using an angle iron 6, two clips, and a finishing shield 10 placed between the straight wall of the element 5 and the ends of the fourth branches of the clips, which it bends downwardly to provide a secure jam fastening.

In FIG. 12, before the introduction of the finishing shield 10, the unit 11 to be framed, for which the finishing shield ensures support, is placed over the return folds of the profiles 5.

In FIG. 13, the angle iron comprises a heel member 12 which determines the pre-pressure of the branch 4 of the clip, as shown in FIG. 14, before the installation of the finishing shield 10. The insertion of this shield then causes the separation of the heel 12 and an over-pressure of the branch 4, as shown in FIG. 15.

Figure 16:
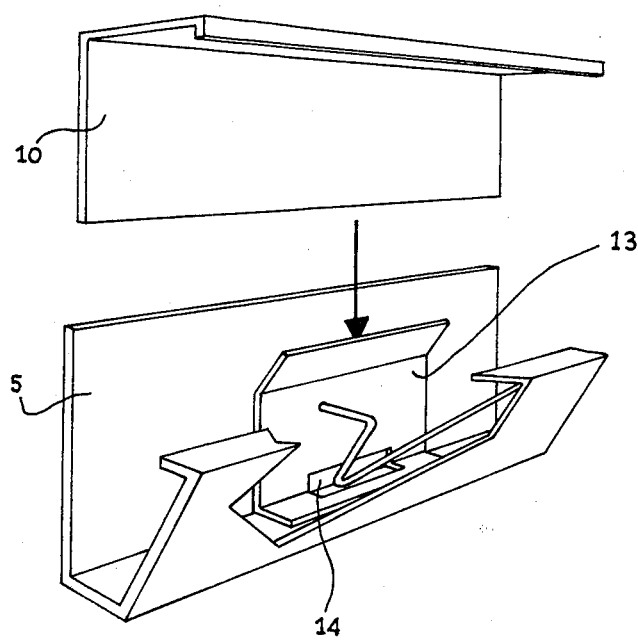
FIG. 16 is a partial perspective view of one of the sides of a framework in which a finishing guard can be frequently removed.

In FIG. 16, the frequent removal of the finishing shield 10 necessitates the presence of a tightening clip 13 for which a little movement is enabled by providing a slit 14 through which the clip projects to engage the dihedral of the profile 5.

In FIGS. 17 and 18, the finishing shield 10 is inserted from the back to tightly clamp the unit 11 against the extended arm of the member 15, the clip being previously placed in the U before the introduction of the finishing shield 10. The use of two clips in inverted positions prohibits both the transversal withdrawal of the finishing shield and its longitudinal sliding in either direction.

Figure 19:
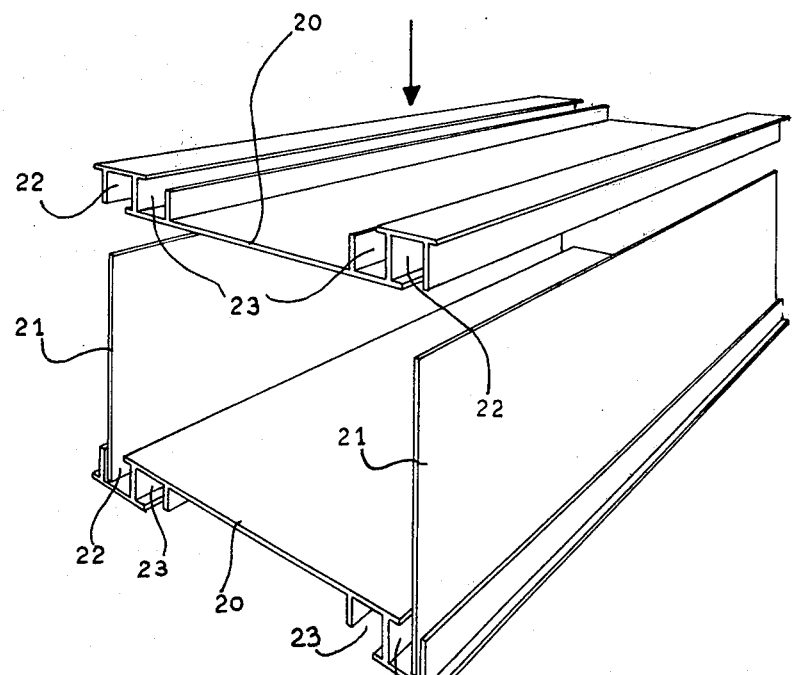
FIGS. 19 and 20 show the use of the clip in forming a sunken panel beam.
Figure 20:
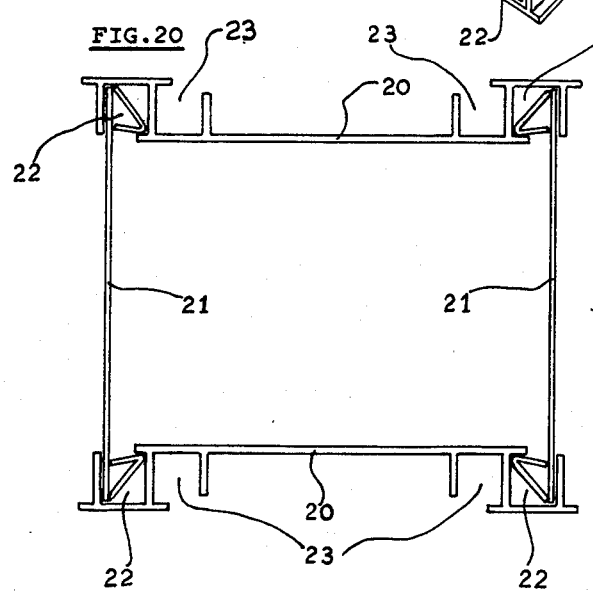

FIGS. 19 and 20 show the application of the clips to assemble a sunken panel beam using two elements 20 joined by two flat members 21. The clips are arranged in the grooves 22 of the elements 20, and it is only necessary to insert the flat members 21 into these grooves to assemble the four pieces. The elements 20 may have outer grooves 23 for the clip assembly of coupling pieces to implement the joining of identical sunken panel assemblies.

Figure 21:
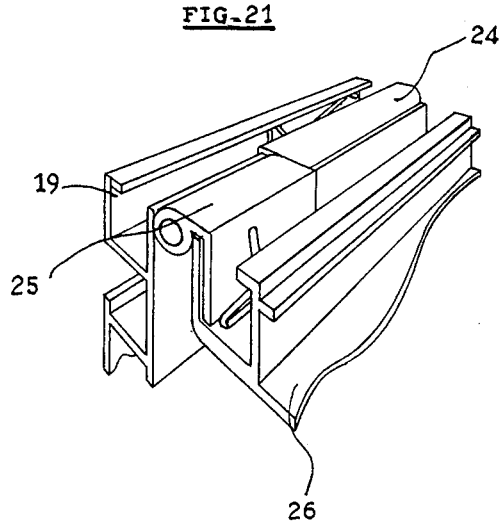
FIG. 21 shows the use of the clip in forming a hinge.

In FIG. 21, the male piece 24 of a hinge is joined to a door frame 19 by means of a clip, the female hinge piece 25 being joined to the door 26 by a clip in the inverted position, thus preventing sliding in both directions.

What is claimed is:

1. A jam fastener for assembling together two elongated members, one of which has a sharp cornered U-shaped cross-section with an inturned edge on one of its arms, comprising:
   (a) a spring steel wire clip having four distinct continuous branches each being bent at an angle with respect to its adjacent branch or branches,
   (b) the first three branches lying in a common bending plane,
   (c) the third and fourth branches defining a dihedral plane which forms a predetermined angle with the bending plane,
   (d) the fourth branch forming an acute angle with the third branch, and
   (e) the length of the fourth branch being slightly greater than the internal width of the desired profile member assembly.

2. A jam fastener as defined in claim 1, wherein the U-shaped member has a square cross-section, and the acute angle between the third and fourth branches is 45°.

3. A jam fastener as defined in claims 1 or 2, wherein the predetermined angle between the bending and dihedral planes is acute.

4. A jam fastener as defined in claims 1 or 2, wherein the predetermined angle between the bending and dihedral planes is obtuse.

5. A jam fastener as defined in claims 1 or 2, wherein the predetermined angle between the bending and dihedral planes is a right angle.

6. A jam fastener as defined in claims 1 or 2, wherein the end of the fourth branch is sharply cut off to implement its tight jamming or wedging against the other one of the members during assembly.

* * * * *